3,184,491
PREPARATION OF 1-HALOMERCURI-2-ALKOXY-CYCLODODECA-5,9-CIS,TRANS-DIENE
Pierre Lafont and Michel Thiers, Lyon, France, assignors to Rhone-Poulenc S.A., Paris, France, a corporation of France
No Drawing. Filed Feb. 19, 1962, Ser. No. 174,241
Claims priority, application France, Feb. 23, 1961, 853,644
2 Claims. (Cl. 260—431)

This invention relates to new organo-mercury compounds, to a process for their preparation and fungicidal compositions containing them.

According to the present invention there are provided the new organo-mercury compounds of the general formula:

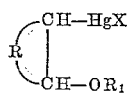  (I)

wherein X represents a halogen (preferably chlorine or bromine) atom, $R_1$ represents an alkyl group containing at most five carbon atoms, and

represents a cyclic group containing twelve carbon atoms which may have a double bond, an epoxide group or two vicinal hydroxy groups in either or both of the 5,6- and 9,10-positions.

It is known that mercuric salts of organic acids add on to ethylenic double bonds to unsaturated hydrocarbon compounds and that when an alcohol is present the alcohol takes part in the reaction. When, for example, mercuric acetate is reacted with an ethylenically unsaturated hydrocarbon in an aliphatic alcohol $R_1OH$ ($R_1$ being as hereinbefore defined) as solvent medium, the reaction can be depicted as follows:

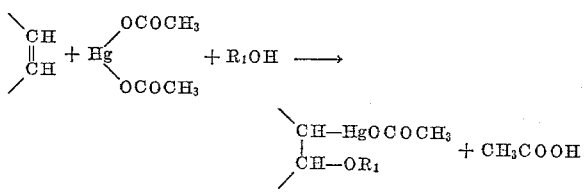

When the acetoxymercuric compound thus obtained is treated with the stoichiometrically necessary quantity of an alkali metal halide, the corresponding halogenomercuric derivative is obtained according to the reaction:

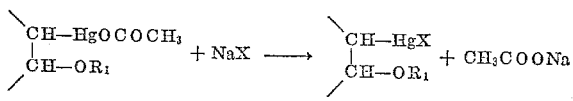

wherein $R_1$ and X are as hereinbefore defined.

This method has previously been used to prepare, in the series of cyclic hydrocarbons, 1-chloromercuri-2-isopropoxycyclohexane from cyclohexene [Berg et al., Canadian J. Chem., vol. 36, page 358 (1958)] and 1-methyl-1-methoxy-2-chloromercuricyclohexane from 1-methylcyclohexene [Robson and Wright, Canadian J. Chem., vol. 38, page 21 (1960)].

It is also known that, when a mercuric salt is reacted with certain cyclic ocmpounds containing several double bonds, polysubstituted derivatives are generally obtained, i.e., compounds in which addition of the mercuric salt has taken place on more than one double bond. Thus, for example, cyclooctatetraene treated with mercuric acetate gives a disubstituted derivative of empirical formula $$C_8H_8(HgOCOCH_3)_2$$

[Japanese Patent No. 725,56, C.A. 51, 5825e (1957)].

It has now unexpectedly been found after research and experimentation that reaction of mercuric salts, for example mercuric acetate, in the presence of an aliphatic alcohol, with cyclic compounds of the general formula

in which the grouping

is as hereinbefore defined, gives mono-alkoxy cyclic compounds containing a single atom of bound mercury, even when the ring contains more than one double bond. By treatment of the resultant acyloxymercuric compounds with an alkali metal halide, compounds of general Formula I can be produced. Thus, for example, commencing with cyclododecatri-1,5,9-enes and mercuric acetate, monoacetoxymercuri-monoalkoxy-cyclododecadienes are obtained selectively which, after treatment with an alkali metal halide, give the corresponding monohalogenomercuri-monoalkoxycyclododecadienes.

It has also been found that when this addition reaction of mercuric salts is carried out on $C_{12}$ polyene cyclic hydrocarbons containing cis and trans double bonds, for example, trans-trans-cis-cyclododec-1,5,9-trienes, only one trans double bond reacts, the cis double bond remaining intact. This fact is unexpected since it has been reported that the cis olefines react more rapidly than their trans isomers [J. Mitchell et coll., Organic Analysis, vol. III, p. 304 (1956)].

According to a feature of the present invention, therefore, the organo-mercury compounds of general Formula I are prepared by the process which comprises reacting in the presence of an aliphatic alcohol $R_1OH$ (wherein $R_1$ is as hereinbefore defined) an ethylenically unsaturated cyclic compound of the general formula:

  (II)

the grouping

being as hereinbefore defined, with a mercuric salt of a carboxylic acid, treating the acyloxy mercuric compound thus obtained with an alkali metal halide, and separating the resultant organo-mercury compound of Formula I from the reaction mixture.

In a preferred method the mercuric salt, for example mercuric acetate, and the cyclic compound are dissolved separately in the minimum quantity of the aliphatic alcohol, such as methanol or ethanol. The two solutions are mixed together with stirring and allowed to stand at room temperature for a period of time which may vary from several hours to several days. The greater part of the alcohol is then evaporated in vacuo and the reaction mass is then treated at room temperature with an aqueous solution of an alkali metal halide, for example, sodium chloride. The reaction mixture is then kept for one or more days at a temperature which is preferably below 10° C. and the precipitate which forms is filtered off, dried and recrystallised.

The organo-mercury compounds of the present invention possess fungicidal activity; in consequence, they can be used, for example, against leaf parasites and for the disinfection of seeds at treatment rates at which hitherto known organo-mercury compounds are normally used. They may also be utilised in other applications where an antifungal activity is required, for example, for addition to paper pulp, paint and certain plastic coverings.

Preferred compounds of Formula I are 1-halogenomercuri-2-alkoxycyclododecadi-5,9-enes (obtained from trans-trans-trans and trans-trans-cis-cyclododecatri-1,5,9-enes), 1 - halogenomercuri-2-alkoxycyclododecanes (obtained from cyclododecene), 1,2-epoxy-5(or 6)-halogenomercuri-6(or 5)-alkoxycyclododec-9-enes (obtained from 1,2-epoxy-cyclododecadi-5,9-ene), and 5(or 6)-halogenomercuri-6(or 5) - alkoxycyclododec-9-en-1,2-diols (obtained from cyclododecadi-5,9-en-1,2-diol).

The following examples illustrate the invention.

*Example I*

A solution of trans-trans-cis-cyclododecatriene (63.2 g.) in methanol (500 cc.) is placed in a 5-litre flask followed by a solution of mercuric acetate (122 g.) in methanol (1700 cc.) and allowed to stand for 24 hours at room temperature. The small amount of precipitate (about 0.5 g.) which forms is filtered off and the solution concentrated to a quarter of its volume by evaporating off a proportion of the methanol in vacuo. A solution of sodium chloride (32 g.) in water (20 cc.) is added, with stirring, over 30 minutes and, after the reaction mass has been kept in a refrigerator for 24 hours, a white precipitate (161 g.) is obtained which, after filtering, drying at 40° C. in vacuo and recrystallisation from methanol, gives 1-chloromercuri-2-methoxycyclododecadi-5,9-ene (117 g.), M.P. 97.5° C. Infra-red spectrographic analysis of this compound shows that it contains a cis double bond and a trans double bond.

*Example II*

A solution of trans-trans-trans-cyclododecatriene (16.2 g.) in methanol (165 cc.) is treated with a solution of mercuric acetate (31.8 g.) in methanol (400 cc.) for 4 days at room temperature and then with sodium chloride (6 g.) in water (40 cc.) as in Example I. The mixture is kept in a refrigerator for two days and then the precipitate obtained is recrystallised from methanol. Trans-trans-1-chloromercuri-2-methoxycyclododecadi-5,9-ene (27.8 g.), M.P. 108° C., is obtained.

A mixture of this compound with its isomer obtained in Example I shows a depression of the melting point (M.P. 85° C. for a 50/50 mixture).

*Example III*

Proceeding as in Example I with the following reactants: trans-trans-cis-cyclododecatriene (64.8 g.) in methanol (500 cc.), mercuric acetate (127.2 g.) in methanol (1800 cc.) and potassium bromide (47 g.) in water (100 cc.), a crystalline product (178 g.) is obtained which gives, after recrystallisation from ethanol, pure cis-trans-1-bromomercuri-2-methoxycyclododecadi-5,9-ene (149 g.), M.P. 93° C.

*Example IV*

Proceeding as in Example II but using ethanol as the reaction medium and commencing with trans-trans-cis-cyclododecatriene (32.4 g.) in ethanol (40 cc.), mercuric acetate (63.6 g.) in ethanol (1340 cc.) and sodium chloride (18.9 g.) in water (150 cc.), a white precipitate is obtained which, recrystallised from benzene, gives cis-trans-1-chloromercuri-2-ethoxycyclododecadi-5,9-ene (26 g.), M.P. 73° C.

*Example V*

A solution of cyclododecene (16.6 g.) in methanol (340 cc.) and a solution of mercuric acetate (31.8 g.) in methanol (420 cc.) are mixed together and allowed to stand at room temperature for 10 days. The reaction mixture is then concentrated to one quarter of its volume and a solution of sodium chloride (6 g.) in water (40 cc.) added. After being kept in a refrigerator for 4 days the precipitate is recrystallised from methanol, giving pure 1-chloromercuri-2-methoxycyclododecane (29 g.), M.P. 86° C.

*Example VI*

A solution of cis-trans-1,2-epoxy-cyclododecadi-5,9-ene (17.8 g.) in methanol (100 cc.) is mixed with a solution of mercuric acetate (31.8 g.) in methanol (400 cc.) and allowed to stand for 2 days at room temperature. Sodium chloride (6 g.) dissolved in water (40 cc.) is then added. After standing for 2 days at about 5° C. and filtering and drying, a white precipitate (26 g.) is obtained which, recrystallised from a mixture of equal volumes of benzene and ethanol, gives pure 1,2-epoxy-5(or 6)chloromercuri-6(or 5)-methoxycyclododec-9-ene (21 g.), M.P. 200° C.

*Example VII*

A procedure identical to that of Example I is followed, commencing with cyclododecadi-5,9-en-1,2-diol (19.5 g.), M.P. 158° C., dissolved in methanol (300 cc.) and mercuric acetate (31.8 g.) dissolved in methanol (400 cc.). The reaction mixture is reduced to a quarter of its volume and a solution of sodium chloride (6 g.) in water (30 cc.) added. After standing for 15 hours at about 5° C., crude 5(or 6)chloromercuri-6(or 5)methoxycyclododec-9-en-1,2-diol (40 g.), M.P. 187° C. after recrystallisation from a mixture of equal volumes of methanol and benzene, is obtained.

According to a further feature of the present invention, there are provided fungicidal compositions containing at least one organ mercury compound of general Formula I in association with one or more diluents compatible with the mercury compound and suitable for use in agricultural fungicidal compositions. Preferably the compositions contain between 0.005 and 50% by weight of organo-mercury compound. The compositions may be solid if there is employed a powdered solid compatible diluent such as talc, calcined magnesia, kieselguhr, tricalcium phosphate, powdered cork, absorbent carbon black or a clay such as kaolin or bentonite. Instead of a solid diluent, there may be used a liquid in which the organo-mercury compound is dissolved or dispersed. The compositions may thus take the form of aerosols, suspensions, emulsions or solutions in water, organic or aqueous organic media, for example aromatic hydrocarbons such as toluene or xylene or mineral, animal or vegetable oils, or mixtures of these diluents. The compositions in the form of dispersions, solutions or emulsions may contain wetting, dispersing or emulsifying agents of the ionic or non-ionic type, for example sulphoricinoleates, quaternary ammonium derivatives or products based on condensates of ethylene oxide, such as the condensates of ethylene oxide with octylphenol, or fatty acid esters of anhydrosorbitols which have been rendered soluble by etherification of the free hydroxyl groups by condensation with ethylene oxide. It is preferable to use agents of the the non-ionic type because they are not sensitive to electrolytes. When desired, the emulsions of the organo-mercury compounds may be prepared in the form of self-emulsifying concentrates containing the active substance dissolved in the dispersing agent or in a solvent containing a dispersing agent compatible with the active substance and solvent, a simple addition of water producing compositions ready for use.

The solid compositions are preferably prepared by grinding the organo-mercury compound with the solid diluent, or by impregnating the solid diluent with a solution of the organo-mercury compound in a volatile solvent, evaporating the solvent and, if necessary, grinding the product so as to obtain a powder. Wetting agents may be incorporated in such solid compositions.

Fertilizers and other pesticides such as insecticides may be admixed with the aforesaid compositions.

For fungicidal purposes the active substances may be employed at dosage rates usually employed for hitherto known organo-mercury fungicides.

The following examples illustrate fungicidal compositions according to the invention.

*Example VIII*

Finely ground 1 - chloromercuri-2-methoxycyclododecadi-5,9-ene (100 g.) is intimately mixed with talc (100 g.). The powder thus obtained is used as a seed-dressing at a rate of 200 g. of powder per hundred weight of seed.

*Example IX*

1-chloromercuri-2-methoxycyclododecadi-5,9 - ene (50 g.) is finely ground with water (90 g.) and a wetting agent (10 g.) obtained by condensing ethylene oxide with octylphenol. A paste is thus obtained which can be dispersed in water (100 litres) immediately before use against potato blight.

We claim:

1. Process for the preparation of a 1-halomercuri-2-alkoxy-cyclododeca-5,9-cis,trans-diene, which comprises reacting at room temperature, in the presence of an alkanol containing at most 5 carbon atoms, cyclododeca-1,5,9-cis, trans, trans-triene with a mercuric salt of a carboxylic acid, evaporating the greater part of the said aliphatic alcohol, contacting the acyloxy-mercuric cyclic compound thus obtained, at room temperature, with an aqueous solution of an alkali metal halide, and separating the precipitated organo-mercury compound from the reaction mixture.

2. Process for the preparation of a 1-chloromercuri-2-methoxy-cyclododeca-5,9-cis,trans-diene, which comprises reacting at room temperature, in the presence of methanol, cyclododeca-1,5,9-cis,trans,trans-triene with a mercuric salt of a carboxylic acid, evaporating the greater part of the said aliphatic alcohol, contacting the acyloxymercuric cyclic compound thus obtained, at room temperature, with an aqueous solution of an alkali metal chloride, and separating the precipitated organo-mercury compound from the reaction mixture.

References Cited by the Examiner

UNITED STATES PATENTS

| 2,523,114 | 9/50 | Hawley | 167—30 |
| 2,551,734 | 5/51 | Gillespie | 260—431 |
| 2,637,677 | 5/53 | Dinerstein | 167—30 |
| 2,675,400 | 4/54 | Howard | 260—431 |
| 2,793,975 | 5/57 | Mark | 167—33 |
| 2,978,464 | 4/61 | Wiese et al. | 260—348 |
| 2,997,483 | 8/61 | Gray | 260—348 |

FOREIGN PATENTS 835,771   5/60   Great Britain.

OTHER REFERENCES

Chatt, Chemical Reviews, volume 48, 1951, pages 7 to 43 (pages 15, 21, 31 principally relied on.)

TOBIAS E. LEVOW, *Primary Examiner.*

IRVING MARCUS, *Examiner.*